Oct. 19, 1965 F. A. SATTLER ETAL 3,213,055
DIISOCYANATE MODIFIED EPOXY POLYESTER-AMIDE COATING RESINS
AND ELECTRICAL CONDUCTORS INSULATED THEREWITH
Filed July 26, 1962

WITNESSES

INVENTORS
Frank A. Sattler &
Florian J. Zukas
BY
ATTORNEY

United States Patent Office 3,213,055
Patented Oct. 19, 1965

3,213,055
DIISOCYANATE MODIFIED EPOXY POLYESTER-AMIDE COATING RESINS AND ELECTRICAL CONDUCTORS INSULATED THEREWITH
Frank A. Sattler, Monroeville, and Florian J. Zukas, Kennett Square, Pa., assignors to Westinghouse Electric Corporation, East Pittsburgh, Pa., a corporation of Pennsylvania
Filed July 26, 1962, Ser. No. 212,536
3 Claims. (Cl. 260—33.4)

This application is a continuation-in-part of application Serial No. 738,797, filed May 29, 1958, and assigned to the assignee of this application.

The present invention relates to electrical insulation and has particular reference to polyester-amide and epoxy-modified polyester amide resins modified by certain diisocyanate resins. The invention also relates to enamel coatings containing such modified resins and to metallic conductors coated with enamel compositions containing these modified resins.

Enamel coatings on metallic electrical conductors such as wire must be tough and hard to withstand the severe mechanical abuses to which the wire is subjected in service. Thus, coils frequently are wound from enameled wire under considerable tension. The enamel must withstand the abrasion, bending stresses and heavy tension encountered during such winding without breaking, cracking or otherwise separating from the wire.

After coils are wound, they usually are dipped in hot varnishes containing one or more of a variety of organic solvents and then baked at temperatures as high as 250° C. To be completely satisfactory, the enamel coatings must be thermally stable and resistant to the action of varnishes, solvents, oils, grease, water, grit and dust that may be encountered in service.

Wire enamel solutions should be capable of being stored for long periods of time without substantially increasing in viscosity. Moreover, the enamel solutions, after being applied to wire, should be capable of being baked or heat treated over a relatively wide range of temperatures to effect curing of the enamel on the wire. The applied cured coating of resins also should be smooth and free from pinholes or other flaws. Furthermore, a thin coating of the cured enamel should possess a high dielectric strength and have other desirable insulating properties.

Wire enamels available heretofore have, to varying degrees, possessed the desirable properties described hereinabove. There long has been a need in the electrical industry, however, for a wire enamel composition which can be applied rapidly to metallic conductors in conventional curing towers.

The surprising discovery has now been made that by adding critical amounts of certain specific diisocyanate addition products, to be described more fully hereinbelow, to either a polyester-amide or epoxy modified polyesteramide resin, an enameling composition results which may be applied to metallic conductors in conventional wire coating towers at surprisingly rapid coating speeds.

An object of the present invention is to provide polyester-amide or epoxy modified polyester-amide resins modified with critical amounts of certain specific diisocyanate resins.

Another object of the present invention is to provide an electrical insulating enamel suitable for applying to electrical conductors at fast coating speeds, the enamel comprising a solvent in which there is dissolved or blended a polyester-amide resin or an epoxy modified polyester-amide resin with critical amounts of certain specific diisocyanate resins.

Another object of the present invention is to provide electrical conductors insulated with an enamel containing a polyester-amide or epoxy modified polyester-amide resin modified by critical amounts of certain diisocyanate resins.

Other objects of the invention will, in part, be obvious and will, in part, appear hereinafter.

For a better understanding of the nature and objects of the invention, reference is made to the following detailed description taken in conjunction with the accompanying drawing, in which.

Figure 1:
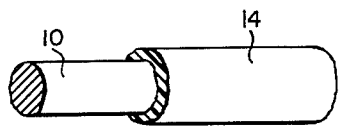
FIGURE 1 is a fragmentary, perspective view, partly in cross-section of an electrical conductor provided with an enamel coating prepared in accordance with this invention.

In accordance with the present invention and in the attainment of the foregoing objects there are provided thermosettable resinous enamel compositions derived by admixing and blending (A) from 90% to 40% by weight of a polyester-amide derived by reacting (a) at least one acidic compound selected from the group consisting of aliphatic ethylenically unsaturated dicarboxylic acids, aromatic dicarboxylic acids, anhydrides thereof, and dialkyl esters thereof, (b) at least one acidic compound having no ethylenic unsaturation selected from the group consisting of aliphatic dicarboxylic acids and their anhydrides, (c) at least one primary amine alcohol selected from the group consisting of monoethanolamine and monoisopropanolamine, (d) optionally, a primary diamine compound selected from the group consisting of ethylene diamine, propylene diamine, and urea, and (e) at least one polyhydric alcohol, the polyhydric alcohol comprising not over 75 mol percent of a polyhydric alcohol having at least four reactive hydroxyl groups, and (B) from 10% to 60% by weight, on a solids basis, of certain specific diisocyanate resins to be described hereinafter, with a suitable hydrocarbon solvent (C), also described hereinafter.

In accordance with still another aspect of the present invention there is provided an insulated electrical conductor comprising, in combination, a metallic electrical conductor and cured, solid resinous insulation disposed on the conductor, the resinous insulation comprising the heat-cured copolymer of the resinous mixture of (A) and (B) described hereinabove.

The invention also contemplates using the specific diisocyanate resins herein described to modify polyester-amide resins which latter resins have been reacted previously with a glycidyl polyether resin. Such epoxy modified polyesteramide resins also may be used in preparing the wire enamels and finished insulated conductors herein described and claimed.

Diisocyanate resins which are suitable for use in accordance with this invention include those which are prepared by admixing and reacting (1) at least one diisocyanate with (2) at least one phenol compound, and (3) at least one polyhydric alcohol.

Examples of suitable diisocyanates include 2,4-tolylene diisocyanate, 2,6-tolylene diisocyanate, dianisidine diisocyanate, methylene bis(p-phenylene isocyanate), and 3,3′ bitolylene, 4,4′ diisocyanate, either singly or in mixtures of two or more.

Phenolic compounds which are suitable for use in preparing the diisocyanate resins include those compounds selected from the group consisting of hydroxy benzene, cresols, and xylenols. Examples of specific phenols include hydroxy benzene; ortho cresol; meta cresol; para cresol; cresylic acid; 2,4-xylenol, 2,6-xylenol; and 3,5-xylenol; either singly or in mixtures of two or more.

The polyhydric alcohols which are used in preparing the diisocyanate resins include saturated aliphatic polyhydric alcohols having from 2 to 11 carbon atoms per molecule, there being present at least 50 mol percent of an alcohol having at least three reactive hydroxyl groups. Examples of suitable alcohols include trimethylol propane, trimethylolethane, trimethylolbutane, propanediol, trimethylolhexane, trimethylolheptane, and trimethyloloctane, the alcohols being used either singly or in mixtures of two or more.

In preparing the diisocyanate resin adduct, first the diisocyanate (1) and phenolic compound (2) are admixed and heated at 105° C. to 120° C. for about one hour while sparging with an inert gas such as nitrogen. Then, the polyhydric alcohol (3) is added slowly over a period of about one hour at a temperature of from about 125° C. to 145° C. Additional phenolic compound then is added to form a low viscosity diisocyanate product. The three reacting components identified above as (1), (2), and (3) are employed in amounts whereby there are present from 0.8 to 1.2 mols of (1) for each hydroxyl group in (3) and from 1 to 5 mols of (2) for each one mol of (1).

Polyester-amides suitable for use in accord with this invention may be prepared using the following components:

(a) From 3 to 4.5 mols of at least one acidic compound selected from the group consisting of aliphatic ethylenically unsaturated dicarboxylic acids, aromatic dicarboxylic acids, anhydrides thereof, and dialkyl esters of aromatic dicarboxylic acids. Specific examples include maleic acid, maleic anhydride, citraconic acid, citraconic anhydride, aconitic acid, fumaric acid, dilinoleic acid, phthalic acid, isophthalic acid and dimethyl terephthalate, either singly or in mixtures of two or more.

(b) From 0.5 to 2.0 mols of at least one acidic compound having no ethylenic unsaturation selected from the group of aliphatic acids, anhydrides thereof, having at least two noncarboxyl carbon atoms and having no other reactive groups than the carboxyl or anhydride groups. Specific examples of suitable acids include adipic acid, succinic acid, azelaic acid, diglycolic acid, and sebacic acid. These acids may be used singly or in mixtures of two or more.

(c) From 1.5 to 4.7 mols of at least one amine alcohol, the amine alcohol component comprising at least 75 mol percent of at least one primary amine alcohol selected from the group consisting of monoethanolamine and monoisopropanolamine and up to 25 mol percent may comprise diethanolamine or other secondary amine alcohol, no other reactive group than the amino group and the hydroxyl group being present.

(d) Up to 0.7 mol of a primary diamine compound; the primary diamine compound comprising at least one selected from the group consisting of ethylene diamine, propylene diamine and urea, the sum of the mols of (c) and (d) equaling at least 2.2 and not exceeding 4.7, and (e) From 1 to 2.4 mols of at least one polyhydric alcohol, the polyhydric alcohol comprising not more than 75 mol percent of a polyhydric alcohol having at least four reactive hydroxyl groups. Examples of suitable polyhydric alcohols include glycerol, ethylene glycol, diethylene glycol, pentaerythritol, 1,1,1-trimethylolpropane, 1,4-butanediol, 1,6-hexanediol, paraffinic glycols with up to eight carbon atoms in a chain, either singly or in mixtures thereof. The hydroxyl groups are substantially the only reactive groups in these polyhydric alcohols.

The components (a), (b), (c), (d), and (e) employed in preparing the polyester-amide for this invention should be so proportioned that there is either a stoichiometric balance of acid and anhydride groups to the total number of hydroxy and amine groups or not more than 20 mol percent excess of hydroxy and amine groups to the carboxyl and anhydride groups.

Highly satisfactory polyester-amide resins may be prepared by reacting the above components either while exposed to the atmosphere or in a closed reaction vessel while sparging with an inert gas such as, for example, nitrogen. The reaction is not critical as to the order in which the ingredients are admixed. It may be necessary to add some of the ingredients slowly in order that the initial reaction on contact not be too violent. After all the ingredients have been added, the reaction mixture may be heated at a rate to reach a temperature of from 140° C. to 210° C. in about one hour. However, the rate of heating ordinarily is preferably conducted more slowly with batches of 25 gallons or larger. For example, in a large reaction vessel it may take as much as ten hours to reach a temperature of 145° C. Good results have been attained when the heating was such as to reach a temperature of 160° C. in the reaction vessel in about six hours.

The described polyester-amide resin may be modified with the described diisocyanate resin in accordance with this invention by admixing (A) 10% to 60% by weight of the diisocyanate resin described above, on a solids basis, with (B) from 90% to 40% by weight of the polyester-amide resin prepared as described above, the components admixed in the presence of a suitable solvent (C), for example, cresol. The resultant admixture may be diluted to a suitable viscosity by the addition of additional solvent, for example, at least one solvent selected from the group consisting of cresol, xylene, cresylic acid, phenol and ethanol.

Solutions of the diisocyanate-modified polyester-amide resin may be employed in coating wire either by dip coating, die-coating or like techniques. Furthermore, coils and other electrical members may be dipped or impregnated in these compositions.

Epoxy modified polyester-amides suitable for use according to this invention are prepared employing a polyester-amide resin prepared by admixing and heating to reaction the following:

(a) From 3 to 4.5 mols of at least one acidic compound selected from the group consisting of aliphatic ethylenically unsaturated dicarboxylic acids, anhydrides thereof, aromatic dicarboxylic acids, anhydrides thereof and dialkyl esters of aromatic dicarboxylic acids. Examples are maleic acid, maleic anhydride, citraconic acid, citraconic anhydride, aconitic acid, fumaric acid, 3,6-endomethylene-Δ-4-tetrahydrophthalic anhydride, dilinoleic acid, phthalic acid, isophthalic acid, dimethyl terephthalate and mixtures of two or more members of the group. The preparation of dilinoleic acid is set forth in an article beginning on page 65 of the March, 1947 issue of the Journal of American Oil Chemists Society, vol. 24.

(b) From 0.5 to 2 mols of an acidic compound having no ethylenic unsaturation, selected from the group of aliphatic acids and their anhydrides, having at least two non-carboxyl carbon atoms and having no other reactive groups than the carboxyl or anhydride groups; examples thereof are adipic acid, succinic acid, azelaic acid, diglycolic acid and sebacic acid; particularly good results follow in using compounds having from 2 to 8 non-carboxyl carbon atoms linked in a straight chain between terminal carboxyl groups.

(c) From 1.5 to 4.7 mols of an amine alcohol, the amine-alcohol comprising at least 75 mol percent of at least one primary amine-alcohol selected from the group consisting of monoethanolamine and monoisopropanolamine, and up to 25 mol percent may comprise diethanolamine or other secondary amine alcohol, no other reactive group than the amino group and the hydroxyl group being present.

(d) Up to 0.7 mol of a primary diamino compound; the primary diamino compound comprises at least one selected from the group consisting of ethylene diamine; propylene diamine, (1,3-propylene diamine) and urea; the sum of the mols of the amine-alcohol and the primary diamino compound equaling at least 2.2 and not exceeding 4.7.

(e) From 1 to 2.4 mols of at least one polyhydric alcohol, not more than 75 mol percent of the polyhydric alcohol having more than three reactive hydroxy groups. Examples of suitable polyhydric alcohols are glycerol, ethylene glycol, diethylene glycol, pentaerythritol 1,1,1-trimethylolpropane, 1,4-butanediol, 1,6-hexanediol, paraffinic glycols with up to 8 carbon atoms in a chain, and mixtures thereof. The hydroxyl groups are substantially the only reactive groups in these polyhydric alcohols.

Between 0.05 and 0.5 mol of an aliphatic unsaturated monocarboxylic fatty acid having from 16 to 18 carbon atoms in a chain terminating in the carboxyl group may be introduced and reacted simultaneously into the reaction product. Suitable fatty acids are tung oil fatty acids, linseed oil fatty acids, ricinoleic acid, oleic acid, linoleic acid and linolenic acid.

In reacting the components for the polyesteramide composition employed in the preparation of the epoxy modified polyester-amide, it is preferable that the proportions be so maintained that the carboxyl groups do not exceed a 10% stoichiometric excess over the combined alcohol and amine groups. A somewhat greater excess of total alcohol and amine groups can be tolerated, not to exceed a 20% stoichiometric excess over the carboxyl groups. In such proportioning, as is well known, an acid anhydride is equal to two carboxyl groups. If fine wire of a size equal to 24 A.W.G. and finer is to be coated, the acid can be present in a stoichiometric excess of up to 15% and the amine and alcohols can be present up to a stoichiometric excess of 25%.

The reaction to produce the polyester-amide composition for further reaction with an epoxy may be conducted either exposed to the atmosphere or in a closed reaction vessel sparged with an inert gas, as for example, nitrogen. The reaction is not critical as to the order in which the ingredients are admixed. It may be necessary to add some of the ingredients slowly in order that the initial reaction on contact be not too violent. After all the ingredients have been added, the reaction mixture may be heated at a rate to reach a temperature of 160° C. in the reaction vessel in six hours. The size of the reaction vessel, heating and cooling facilities and other factors may vary, so no precise rule can be given for the rate of temperature rise. However, it is desirable that the maximum temperature attained during reaction be within the range of 140° C. to 210° C. and the reaction continued at this temperature for a sufficient length of time to cause resinification to the point that the reaction product has a ball and ring softening temperature of not over 90° C.

The resinous epoxide employed in the preparation of the epoxy-modified polyester-amide is prepared in a separate reaction vessel by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), 4,4'-dihydroxy-diphenyl methyl-methane and 4,1'-dihydroxy-diphenyl-methane. In admixture with the named polynuclear phenols, use also may be made of those polynuclear phenols wherein the phenol nuclei are joined by sulfur bridges, such for example as 4,4'-dihydroxy-diphenyl-sulfone. Polyhydric alcohols are glycerol, propylene glycol and 1,5-pentanediol.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

where $n$ is an integer of the series 0, 1, 2, 3 . . . and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups

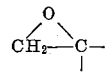

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

The 1,2-epoxide value of the glycidyl polyether is determined by heating a weighted sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded and the lower layer, containing the desired glycidyl polyether, is washed with hot water to remove unreacted alkali and halogen salt, in this case, sodium chloride. If desired, dilute acids, for example, acetic acid or hydrochloric acid, may be employed during the washing procedure to neutralize the excess alkali. The neutral resinous reaction product may then be heated at temperatures of as high as 160° C. to increase the molecular weight and viscosity of the resinous product to the desired ball and ring temperature.

The reacted resinous epoxy modified polyester-amide employed in this invention is prepared by reacting (A) from 60 to 95 parts by weight of the specific polyester-amide reaction product detailed hereinabove having a ball and ring softening temperature of not over 90° C. and (B) from 5 to 40 parts by weight of a resinous epoxide having a ball and ring softening temperature of from 40° C. to 140° C. and heating the mixture of (A) and (B) to react it to a copolymer or cocondensate having a ball and ring softening temperature of from 27° C. to 55° C. for a 70% solution of the copolymer in cresol.

In combining the above components to form a diisocyanate-epoxy-modified polyester-amide wire coating enamel, the resinous epoxy composition, with a ball and ring softening temperature of from 40° C. to 140° C. and preferably dissolved in a large excess of a solvent such, for example, as cresylic acid, cresol, phenol and the like, is introduced into the reaction vessel containing the polyester-amide composition and reacted therewith. The reaction of the epoxy resin and the polyester-amide resin is carried out at a temperature above 100° C. in order to promote copolymerization or condensation. The reaction temperature is increased at the rate of approximately 10° C. per hour until a temperature of approximately 200° C. is reached. At approximately 200° C. the resin solution becomes viscous and thread-forming.

At this point, the epoxy-modified polyester-amide may be diluted with a suitable solvent, for example, cresol and the resultant solution admixed or blended with the diisocyanate resin.

In admixing or blending the epoxy-modified polyester-amide with the heretofore described diisocyanate resin, the proportions of these materials are identical to the proportions of polyester-amide and diisocyanate resin heretofore described. Thus, a thermosettable resinous enamel composition is provided by admixing and blending (A) from 90% to 40% by weight of the described epoxy modified polyester-amide and (B) from 10% to 60% by weight, on a solids basis, of the specific diisocyanate resins with at least one suitable hydrocarbon solvent selected from the group consisting of cresol, xylene, cresylic acid, phenol and ethanol.

The diisocyanate - epoxy - polyester - amide enameling composition, suitably diluted with a hydrocarbon solvent may be employed in the coating of electrical conductors by any of the known techniques. As with the heretofore described diisocyanate-polyester-amide enameling composition, conductors maybe insulated with the heat reaction product of the composition employing significant and surprising short baking cycles. Moreover, in the case of the cured diisocyanate-epoxy-polyester-amide resinous coating a significant improvement in repeated abrasion and heat shock properties will be attained.

In order to illustrate the invention even more fully, the following specific examples are set forth. The parts given are by weight unless otherwise indicated.

*Example I*

(a) 117.8 parts of maleic anhydride, 117 parts of adipic acid and 62.1 parts of ethylene glycol were charged into a suitable reaction vessel. 61.1 parts of monoethanolamine was added dropwise to the other ingredients over a 15-minute period. The reaction mixture was heated from approximately 140° C. to approximately 190° C. at a rate of approximately 6° C. to 10° C. per hour while sparging with nitrogen. At 190° C. the resultant polyester-amide resinous mixture became viscous and thread-forming.

The procedure of paragrah (a) above was repeated to prepare an equally satisfactory polyester-amide resin using the following reactants:

(b)

| | Parts |
|---|---|
| Maleic anhydride | 117.8 |
| Adipic acid | 117.0 |
| Monoethanolamine | 61.0 |
| Glycerol | 61.5 |

*Example II*

This example illustrates the preparation of a glycidyl polyether. Four mols of 4,4'-dihydroxydiphenyl-2,2'-propane and five mols of epichlorohydrin were added to an aqueous caustic soda solution containing approximately 6.43 mols of sodium hydroxide. The reaction mixture was heated slowly from an initial temperature of 40° C. to 100° C. in a period of approximately 80 minutes. The reaction was allowed to continue for approximately one hour at a temperature in the range of from 100° C. to 104° C. The reaction mixture was then permitted to stand until it separated into two layers. An upper aqueous layer was drawn off and discarded. The lower layer containing the resinous reaction product was first washed with water several times and the water withdrawn to remove excess caustic. Dilute acetic acid was then stirred into the mixture to neutralize any remaining unreacted caustic. Further washing in water was carried out until the washing was neutral to litmus. The water was separated from the resinous reaction product by decantation and the reaction product was then heated to 150° C. to remove all additional traces of water. The heating was continued until the softening point of the resinous reaction product was 70° C. as determined by the ball and ring test.

*Example III*

An epoxy-modified polyester-amide composition was prepared by introducing 808.5 parts of maleic anhydride, 343.5 parts of adipic acid, 280.2 parts of glycerol, and 65.5 parts of ethylene diamine (79.2%) into a suitable reaction vessel with stirring To the mixture there was added, over a period of 15 minutes, 315.9 parts of ethanolamine while gradually raising the temperature of the resultant mixture to aproximately 140° C. With nitrogen sparging heat was applied as necessary to maintain the temperature of the mixture at 140° C. during the next two hours, then gradually increased to 155° C. during the succeeding 2½ hours. When a ball and ring softening temperature of 64° C. was reached, 180 parts by weight of the epoxy resin prepared as described in Example II was dissolved in 849 parts of cresol and added. The reaction was continued at 155° C. and increased to 175° C. at a rate of 5° C. per 50 minutes. At a ball and ring softening temperature of 38° C. heating was discontinued and 1470 parts of metaparacresol were added. Thereafter, the solution was diluted with 1795 parts of xylene and 1795 parts of ethanol. The solids content or non-volatile resin yield was 1660 parts.

Example IV

A diisocyanate resin was prepared by admixing 870.5 parts of 2,4-tolylene diisocyanate and 1500 parts of meta-para-cresol with nitrogen sparging at 10° C. for one hour. 240 parts of trimethylolpropane was added slowly and reacted at 130°–140° C. for one hour, after which heating was discontinued and 320 grams of meta-para-cresol and 270 grams of xylene were added. The solids content or non-volatile resin yield was 1090 parts.

Example V

A diisocyanate resin was prepared according to the procedure of Example IV with the exception that 200 parts of trimethylolethane were used in place of the 224 parts of trimethylolpropane. The solids content or non-volatile resin yield was 1070 parts.

Example VI

A wire enamel composition was prepared by blending 89% by weight of the product of Example III with 11% by weight of the product of Example IV, the percentages being based upon the non-volatile resin yield. Otherwise expressed, the enamel was prepared by adding 19% of the yield of Example IV to the total solution prepared in Example III. This enamel composition was satisfactorily applied to No. 17 A.W.G. copper wire at a rate of 31 feet per minute in a 15 foot enamel coating tower. By way of comparison, a similar enamel containing an epoxy-modified polyester-amide which has not been blended with the herein described diisocyanate resin can be coated at a maximum speed of only about 25 feet per minute.

Example VII

A wire enamel composition was prepared by adding 46% of the yield of Example IV to the solution prepared in Example III. This enamel composition was coated on No. 17 A.W.G. wire at a rate as fast as 40 feet per minute. Enamel containing diisocyanate-free polyester-amide resin can be applied at speeds of up to only 25 feet per minute. On No. 36 A.W.G. wire coating speeds of over 100 feet per minute are possible, as compared with maximum speeds of only 60 feet per minute for enamels containing diisocyanate-free epoxy-modified polyester-amide resins.

Example VIII

A wire enamel composition was prepared by adding 88% of the yield of Example IV to the yield of Example III. The resultant enamel was coated on No. 17 A.W.G. copper wire at speeds as high as 40 feet per minute, as compared with maximum speeds of only 25 feet per minute for enamels containing diisocyanate-free epoxy-modified polyester-amide resins.

Example IX

An enamel composition was prepared by mixing all of the product of Example III with 1.61 times the reaction product of Example IV. This enamel may be coated satisfactorily on No. 17 A.W.G. wire at rates as high as 40 feet per minute, as compared to maximum speeds of only 25 feet per minute for enamels containing diisocyanate-free epoxy-modified polyester-amide resins.

Example X

A wire enamel was prepared by adding 27.6% of the product of Example V to all of the product of Example III. This enamel could be coated satisfactorily on No. 17 A.W.G. wire at a rate of 32 feet per minute, as compared to maximum coating speeds of only 25 feet per minute for enamels containing epoxy-modified polyester-amide resins which have not been blended with the diisocyanate.

Example XI

A wire enamel was prepared by admixing 66.5% of the product of Example V with all of the product of Example III. This enamel was coated satisfactorily on No. 17 A.W.G. copper wire at a coating speed as high as 40 feet per minute, as compared to maximum coating speeds of only 25 fet per minute for enamels which have not been blended with the diisocyanate resin.

Example XII

A wire enamel may be prepared by adding and mixing 12% of the diisocyanate resin yield of Example V with all of the polyester-amide product of Example I(a). When the coating speed of this enamel blend is compared to the coating speed of polyester-amide compositions without the diisocyanate resin, an improvement equivalent to that illustrated is Examples VI through XI will be noted.

Example XIII

The product of Example I(b) may be substituted for the product of Example I(a) in Example XII with equivalent results.

The cured coatings of Examples VI through XI, inclusive, were subjected to certain physical tests to determine their suitability for use in the electrical industry. All these cured enamels had improved abrasion scrape hardness resistance and thermal shock resistance as compared to the same compositions without the diisocyanate resins.

Referring to the drawing, there is illustrated a conductor 10 comprising a copper conductor coated with a hard, tough, solid, resinous enamel 14 produced by applying a specific solvent solution of the diisocyanate polyester-amide resin of this invention thereto and curing by heat treatment. It will be understood that the coating 14 may be applied by any suitable means, such as by dipping, die-coating, or the like. In the drawing, the enamel coatings illustrated are shown to be quite thick with respect to the wire size for purposes of clarity of illustration only.

One method particularly suitable for applying the enamels prepared in accordance with this invention to conductors comprises, passing an electrical conductor or wire through an enamel solution, and then passing it through a drying tower to remove the enamel solvent and effect a cure of the enamel on the wire. Satisfactory results have been obtained when No. 17 A.W.G. copper wire was passed through a 15 foot drying and curing tower at velocities of from 17 feet to 40 feet per minute and at tower temperatures varying from 400° C. to 475° C.

Conductor 10, while described as being copper, may be of a metal such as copper, aluminum, silver, either alone or as plated or clad combinations or alloys, as well as nickel-chromium alloys, stainless steel alloys, anodized aluminum or the like. After curing by heating, coating 14 adheres tenaciously to the copper conductor 10. While the conductor 10 is illustrated as being circular in cross section, it may be of any other desirable cross section such as square, rectangular, and the conductor may be flat strip or metal foil.

Figure 2:
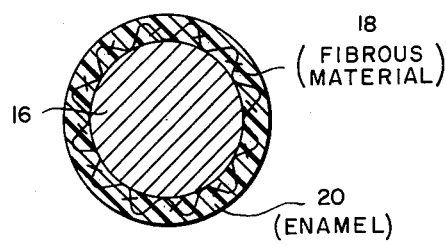
FIG. 2 is a cross-sectional view of a conductor insulated with a fibrous material impregnated with an enamel of this invention.

The enamels of the present invention also may be applied to electrical conductors such as wire in combination with coatings of both organic and inorganic fibrous materials. One form of such modification is illustrated in FIG. 2. A copper wire 16 is provided with an exterior coating 18 of fibrous material, which may be glass fibers, asbestos fibers, paper, cotton, silk or the like either wrapped or braided or woven, or various combinations thereof. A quantity of the enamel 20 of this invention is impregnated into the fibrous coating 18 and baked to provide a composite insulation about copper wire 16.

Figure 3:
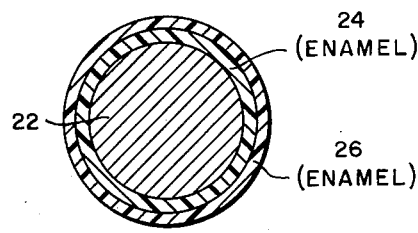
FIG. 3 is a cross-sectional view of a conductor insulated with an enamel of this invention and another enamel.

The resinous coatings of this invention may be applied to conductors in combination with coatings of other resinous compositions. As illustrated in FIG. 3 of the drawing, the conductor 22 may carry a coating of the resinous compositions disclosed herein and a coating 26 of another resin, as for example, an organosiloxane, polyvinyl acetal and the like. In some instances, the order of application of the coatings may be advantageously reversed.

Since certain changes in carrying out the above processes and in the product embodying the invention may be made without departing from its scope, it is intended that the accompanying description and drawing be interpreted as illustrative and not limiting.

We claim as our invention:

1. A resinous composition comprising the product derived by admixing and heating (A) 90% to 40% by weight of an epoxy-modified polyester amide copolymer derived by reacting together from 60 to 95 parts by weight of (1) a polyester-amide derived by reacting (a) from 3 to 4.5 mols of at least one acidic compound selected from the group consisting of aliphatic ethylenically unsaturated dicarboxylic acids, aromatic dicarboxylic acids, anhydrides thereof, and dialkyl esters of aromatic dicarboxylic acids, (b) from 0.5 to 2 mols of at least one compound having no ethylenic unsaturation selected from the group consisting of aliphatic dicarboxylic acids and their anhydrides, (c) from 1.5 to 4.7 mols of at least one primary amine alcohol selected from the group consisting of monoethanolamine and monoisopropanolamine, (d) up to 0.7 mol of at least one primary diamino compound selected from the group consisting of ethylene diamine, propylene diamine and urea, the sum of the mols of (c) and (d) equaling at least 2.2 and not exceeding 4.7 and (e) from 1 to 2.4 mols of at least one polyhydric alcohol, the polyhydric alcohol comprising not over 75 mol percent of a polyhydric alcohol having at least four reactive hydroxyl groups, the proportion of the reactants (a), (b), (c), (d) and (e) being selected so that the carboxyl groups do not substantially exceed a 10% stoichiometric excess over the total number of hydroxy and amine groups and the total number of hydroxy and amine groups do not substantially exceed a 20% stoichiometric excess over the number of carboxyl groups, the polyester-amide having been heated to produce a resin having a ball and ring softening temperature of not over 90° C., and 5 to 40 parts by weight of (2) a glycidyl ether reaction product of a polyhydric phenol and an epihalohydrin having a 1,2-epoxy equivalency greater than 1.0 and a ball and ring softening temperature of from 40° C. to 140° C., said copolymer (A) having been produced by heating the mixture of (1) and (2) to react it to a ball and ring softening temperature of from 27° C. to 55° C. for a 70% solution of the copolymer in cresol; with (B) from 10% to 60% by weight of the non-volatile solids present therein of a liquid product derived by admixing and reacting (1) at least one organic diisocyanate with (2) at least one phenol selected from the group consisting of hydroxy benzene, cresols and xylenols and (3) at least one aliphatic saturated polyhdric alcohol having from 2 to 11 carbon atoms per molecule, the polyhydric alcohol including at least 50 mol percent of an alcohol having at least three reactive hydroxyl groups, there being present from 0.8 to 1.2 mols of (1) for each hydroxyl group in (3) and from 1 to 5 mols of (2) for each 1 mol of (1).

2. A thermosettable enamel composition comprising at least one solvent selected from the group consisting of cresylic acid, cresol, phenol, xylene, and ethanol in which there is dissolved (A) from 90% to 40% by weight of an epoxy-modified polyester amide copolymer derived by reacting together from 60 to 95 parts by weight of (1) a polyester amide derived by reacting (a) from 3 to 4.5 mols of at least one acidic compound selected from the group consisting of aliphatic ethylenically unsaturated dicarboxylic acid, aromatic dicarboxylic acids, anhydrides thereof, and dialkyl esters of aromatic dicarboxylic acids, (b) from 0.5 to 2 mols of an acidic compound having no ethylenic unsaturation selected from the group consisting of aliphatic dicarboxylic acids and their anhydrides, (c) from 1.5 to 4.7 mols of at least one primary amine alcohol selected from the group consisting of monoethanolamine and monoisopropanolamine, (d) up to 0.7 mol of at least one primary diamino compound selected from the group consisting of ethylene diamine, propylene diamine and urea, the sum of the mols of (c) and (d) equaling at least 2.2 and not exceeding 4.7 and (e) from 1 to 2.4 mols of at least one polyhydric alcohol, the polyhydric alcohol comprising not over 75 mol percent of a polyhydric alcohol having at least four reactive hydroxyl groups, the proportion of the reactants (a), (b), (c), (d) and (e) being selected so that the carboxyl groups do not substantially exceed a 10% stoichiometric excess over the total number of hydroxy and amine groups and the total number of hydroxy and amine groups do not substantially exceed a 20% stoichiometric excess over the number of carboxyl groups, the polyester-amide having been heated to produce a resin having a ball and ring softening temperature of not over 90° C., and 5 to 40 parts by weight of (2) a glycidyl ether reaction product of a polyhydric phenol and an epihalohydrin having a 1,2-epoxy equivalency greater than 1.0 and a ball and ring softening temperature of from 40° C. to 140° C., said copolymer (A) having been produced by heating the mixture of (1) and (2) to react it to a ball and ring softening temperature of from 27° C. to 55° C. for a 70% solution of the copolymer in cresol; and (B) from 10% to 60% by weight of the non-volatile solids present therein of a liquid product derived by admixing and reacting (1) at least one organic diisocyanate with (2) at least one phenol selected from the group consisting of hydroxy benzene, cresols, and xylenols, and (3) at least one aliphatic saturated polyhydric alcohol having from 2 to 11 carbon atoms per molecule, the polyhydric alcohol including at least 50 mol percent of an alcohol having at least three reactive hydroxyl groups, and there being present from 0.8 to 1.2 mols of (1) for each hydroxyl group in (3) and from 1 to 5 mols of (2) for each 1 mol of (1).

3. An insulated electrical conductor comprising, in combination, a metallic electrical conductor and cured, solid resinous insulation applied to the conductor, the resinous insulation comprising the heat cured product derived by admixing and heating (A) from 90% to 40% by weight of an epoxy-modified polyester amide copolymer derived by reacting together from 60 to 95 parts by weight of (1) a polyester amide derived by reacting (a) from 3 to 4.5 mols of at least one acidic component selected from the group consisting of aliphatic ethylenically unsaturated dicarboxylic acids, aromatic dicarboxylic acids, anhydrides thereof, and dialkyl esters of aromatic dicarboxylic acids, (b) from 0.5 to 2 mols of at least one acidic compound having no ethylenic unsaturation selected from the group consisting of aliphatic dicarboxylic acids and their anhydrides, (c) from 1.5 to 4.7 mols of at least one amine alcohol selected from the group consisting of monoethanolamine and monoisopropanolamine, (d) up to 0.7 mol of at least one primary diamino compound selected from the group consisting of ethylene diamine, propylene diamine and urea, the sum of the mols of (c) and (d) equaling at least 2.2 and not exceeding 4.7 and (e) from 1 to 2.4 mols of at least one polyhydric alcohol, the polyhydric alcohol comprising not over 75 mol percent of a polyhydric alcohol having at least four reactive hydroxyl groups, the proportion of the reactants (a), (b), (c), (d) and (e) being selected so that the carboxyl groups do not substantially exceed a 10% stoichiometric excess over the total number of hydroxy and amine groups and the total number of hydroxy and amine groups do not substantially exceed a 20% stoichiometric excess over the number of carboxyl groups, the polyester-amide having been heated to produce a resin having a ball and ring softening temperature of not over 90° C., and 5 to 40 parts by weight of (2) a glycidyl ether reaction product of a polyhydric phenol and an epihalohydrin having a 1,2 - epoxy equivalency greater than 1.0 and a ball and ring softening temperature of from 40° C. to 140° C., said copolymer (A) having been produced by heating the mixture of (1) and (2) to react it to a ball and ring softening temperature of from 27° C. to 55° C. for a 70% solution of the copolymer in cresol; with (B) from 10% to 60% by weight of the non-volatile solids present therein of a liquid product derived by admixing and reacting (1) at least one diisocyanate with (2) at least one phenol selected from the group consisting of hydroxy benzene, cresols, and xylenols, and (3) at least one aliphatic saturated polyhydric alcohol having from 2 to 11 carbon atoms per molecule, the polyhydric alcohol including at least 50 mol percent of an alcohol having at least three reactive hydroxyl groups, there being present from 0.8 to 1.2 mols of (1) for each hydroxyl group in (3) and from 1 to 5 mols of (2) for each 1 mol of (1).

References Cited by the Examiner

UNITED STATES PATENTS

| | | | |
|---|---|---|---|
| 2,626,223 | 1/53 | Sattler et al. | 117—128.4 |
| 2,798,859 | 7/57 | Bruce | 260—45.4 |
| 2,935,487 | 5/60 | Fox et al. | 260—45.4 |

MORRIS LIEBMAN, *Primary Examiner.*

ALEXANDER H. BRODMERKEL, *Examiner.*